United States Patent
Bachmaier

(10) Patent No.: US 6,169,945 B1
(45) Date of Patent: Jan. 2, 2001

(54) PROCESS FOR CONTROLLING OCCUPANT SAFETY DEVICES CORRESPONDING TO THE REQUIREMENTS

(75) Inventor: Peter Bachmaier, Fahrenzhausen (DE)

(73) Assignee: Bayerische Motoren Werke Aktiengesellschaft, Munich (DE)

( * ) Notice: Under 35 U.S.C. 154(b), the term of this patent shall be extended for 0 days.

(21) Appl. No.: 09/092,993

(22) Filed: Jun. 8, 1998

(30) Foreign Application Priority Data

Jun. 7, 1997 (DE) .............................................. 197 24 101

(51) Int. Cl.⁷ .................................................. B60R 21/32
(52) U.S. Cl. ................. 701/45; 701/36; 701/46; 180/271; 180/272; 280/734; 280/735
(58) Field of Search ................... 701/45, 46, 36; 180/271, 272; 280/734, 735; 307/10.1

(56) References Cited

U.S. PATENT DOCUMENTS

| | | | |
|---|---|---|---|
| 3,918,545 | 11/1975 | Andres et al. | 180/82 |
| 5,014,810 * | 5/1991 | Mattes et al. | 180/268 |
| 5,074,583 | 12/1991 | Fujita et al. | 280/735 |
| 5,366,039 * | 11/1994 | Sawada | 180/197 |
| 5,398,185 | 3/1995 | Omura | 364/424.05 |
| 5,400,487 * | 3/1995 | Gioutsos et al. | 280/735 |
| 5,493,493 | 2/1996 | Shibata et al. | 364/424.05 |
| 5,508,918 * | 4/1996 | Gioutsos | 364/424.05 |
| 5,540,461 | 7/1996 | Nitschke et al. | 280/735 |
| 5,541,842 * | 7/1996 | Gioutsos et al. | 364/424.05 |
| 5,602,734 * | 2/1997 | Kithil | 364/424.055 |
| 5,631,834 * | 5/1997 | Tsurushima et al. | 364/424.055 |
| 5,673,932 | 10/1997 | Nitschke et al. | 280/735 |
| 5,802,479 * | 9/1998 | Kithil et al. | 701/45 |
| 5,903,855 * | 5/1999 | Kiyota | 702/86 |

FOREIGN PATENT DOCUMENTS

| | | |
|---|---|---|
| 22 49 759 C2 | 4/1974 | (DE) . |
| 41 12 579 A1 | 10/1991 | (DE) . |
| 42 12 421 A1 | 10/1993 | (DE) . |
| 43 32 880 C2 | 4/1994 | (DE) . |
| 689 11 428 T2 | 6/1994 | (DE) . |
| 195 29 794 A1 | 2/1997 | (DE) . |
| 94/14638 | 7/1994 | (EP) . |
| 08169289 | 7/1996 | (JP) . |

* cited by examiner

*Primary Examiner*—William A. Cuchlinski, Jr.
*Assistant Examiner*—Marthe Marc-Coleman
(74) *Attorney, Agent, or Firm*—Evenson, McKeown, Edwards & Lenahan, P.L.L.C.

(57) ABSTRACT

A process is provided for controlling occupant safety devices corresponding to specific requirements while taking into account the occupant's expected movement relative to the vehicle. The expected movement of the vehicle occupant is determined on the basis of the expected acceleration profile of the vehicle during the accident and on the basis of the actual parameters of the individual vehicle occupant. The expected acceleration profile of the vehicle is extrapolated on the basis of the acceleration profile which took place up to the respective point in time.

21 Claims, 5 Drawing Sheets

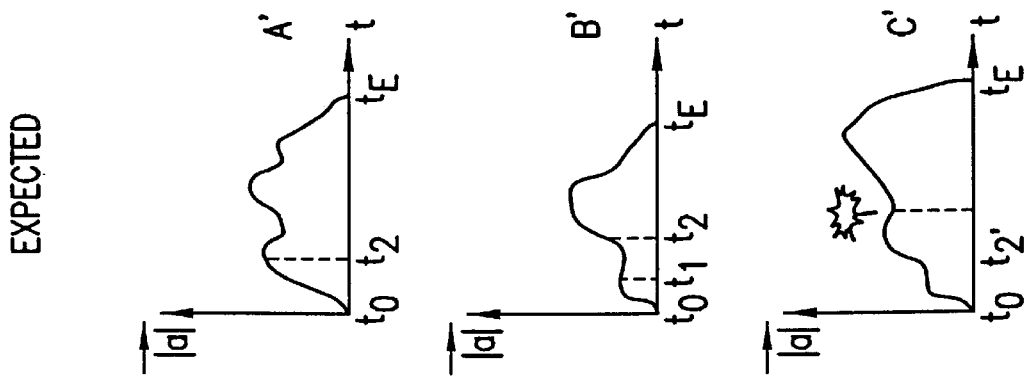
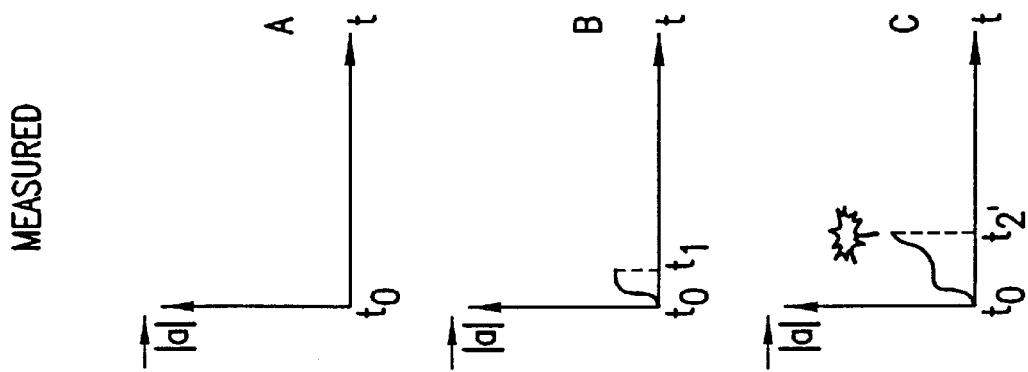
FIG.3

PROCESS FOR CONTROLLING OCCUPANT SAFETY DEVICES CORRESPONDING TO THE REQUIREMENTS

BACKGROUND AND SUMMARY OF THE INVENTION

This application claims the priority of German document number 19724101.8, filed Jun. 7, 1997, the disclosure of which is expressly incorporated by reference herein.

The invention relates to a process for controlling occupant safety devices which correspond to specific requirements while taking into account the occupant's expected movements relative to the vehicle.

These devices include not only air bags for various parts of the body, but also belt tightening devices, impact pads, etc. Controlling the safety devices in accordance with the specific requirements is an improvement over customarily rigid control systems which are oriented only to the characteristics of an average vehicle user.

In this context, it is known from German Patent Document DE 195 20 721 to perform an operation which corresponds to the requirements and a situation-adapted reaction of the control system assigned to the safety devices such that all possible factors, e.g, the seriousness of the accident, the occupant's position, the occupant's size, the occupant's measurements as well as the occupant's age and sex are taken into account. The seriousness of the accident is determined via a suitable pre-crash sensor system. As a function of existing values for the different factors, a pre-existing program is initiated and the safety device is controlled according to the program. The actual severity of the accident is not taken into account in this case. Because of the fixed program structure, controlling the occupant safety devices which meet the specific requirements can therefore not be achieved.

From European Patent Document EP 0 636 074B, it is known to trigger the safety devices in the event of a crash. In this case, the expected displacement of the occupant or his expected relative speed (with respect to the occupant compartment of the vehicle) is estimated via the output signal of an acceleration sensor. This process begins to operate only after a crash event has begun. Here, time-related problems may occur because the acceleration signal is only obtained via the actual accident. Furthermore, only this signal is used as the basis for the prediction and the program-controlled profile for triggering the safety devices.

Finally, it is known from U.S. Pat. No. 5,398,185 to determine the path of movement of the vehicle occupant or of the parts of his body before and during an accident. An example of this is to correspondingly control the safety devices via an on-board camera. In this case, a selective use of the different safety devices takes place such that they effectively protect the vehicle occupant. The actual course of movements is taken into account only to the extent that it determines the point in time at which the various safety devices are made operative.

It is an object of the invention to provide a process for controlling occupant safety devices according to the requirements via which the effectiveness of the safety devices is optimized.

This and other objects and advantages are achieved by utilizing a process for controlling occupant safety devices, in which an acceleration profile during the accident is used for predicting the further profile of the accident. Information concerning the probable accident event which exists, for example, at the start of the accident is not used for carrying out a defined program for triggering the safety devices. If at all, it is used for making a first selection concerning the first relevant program. The acceleration profile will then be examined during each phase of the accident. This occurs regardless of whether the accident profile "curve" determined at first or momentarily applicable is in fact valid (i.e., reflects the actual profile). If this is not the case, the profile "curve" is changed to the "correct" profile curve.

The basis of the selection or the change of the profile curve (relevant to the triggering of the safety devices) is the acceleration profile (=pattern). On the basis of this, it is also permitted to predict the occupant's movement relative to the vehicle interior. Via the comparison of the actual and the desired acceleration profile, it is possible to recognize whether the selected triggering strategy is, in fact, adapted to the accident event or whether it is necessary to forego the first selected triggering strategy in favor of a triggering strategy which provides better protection for the occupant.

As in the case of a crash simulation which is known per se and takes place outside the vehicle, the expected acceleration profile of a vehicle can be obtained by a corresponding on-line calculation. Computing expenditures can be significantly reduced if the expected acceleration profile of the vehicle is selected from stored acceleration profiles. The selection as well as the implementation of the on-line calculation can take place with the use of pre-crash sensors which are known per se.

As known per se from German Patent Document DE 195 20 721 A, information concerning the occupant and the vehicle is also used within the scope of the present application. As taught in the German document, this information can be stored before embarking on a journey. However, it is also possible to store it at an earlier point in time (for example, during an earlier journey) and to then retrieve it from the memory during the current journey. This may take place by a manual input or by a corresponding identification (for example, via a chip card).

However, it is also possible to use the occupant's behavioral parameters, which are automatically furnished by a corresponding sensor system for retrieval of the stored data or even for obtaining the actual data. This is possible without any conscious action by the vehicle occupant. Thus, a personality profile of the occupant can be obtained from the occupant's behavior before and during the start of the journey, or during the journey and his reaction to various driving situations. Furthermore, this personality profile can be matched with a stored personality profile of the occupant himself or of a standard person. Parameters which are relevant within the scope of the invention exist for this profile.

As a rule, the seriousness of the accident is determined via a pre-crash sensor system, particularly with respect to the speed and the collision site of another object in traffic or of a stationary obstacle. However, no information can be derived concerning the "flexibility" of the external object. This information results only from the actual accident event and can be used for adapting the triggering strategy while taking into account the indirectly determined actual seriousness of the accident to the respective accident event. As a result, the desired direction of movement can be determined in a precise manner and the triggering strategy during an accident can be further optimized.

Other objects, advantages and novel features of the present invention will become apparent from the following detailed description of the invention when considered in conjunction with the accompanying drawings.

BRIEF DESCRIPTION OF THE DRAWINGS

FIG. 3 is a diagram depicting expected and measured profiles;

DETAILED DESCRIPTION OF THE DRAWINGS

Figure 1:
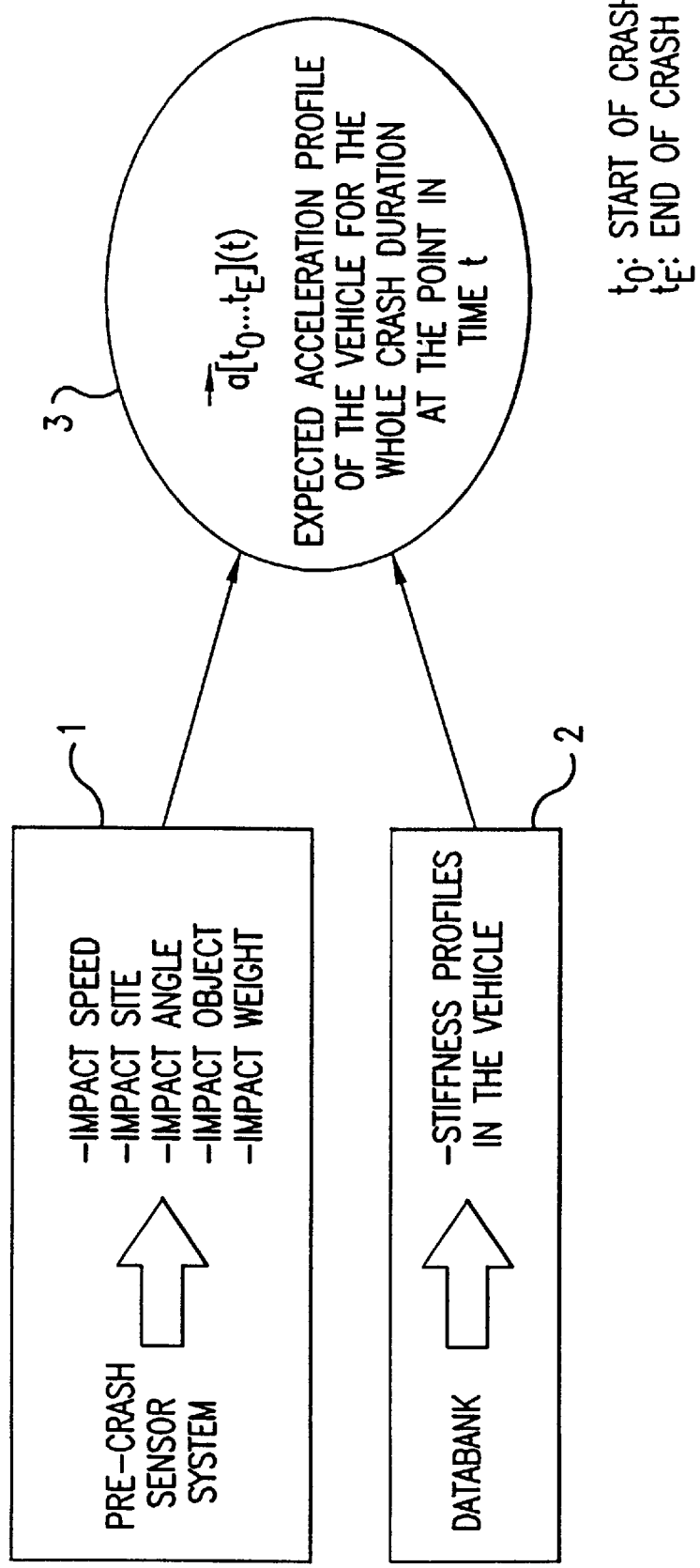
FIG. 1 is a block diagram of the process for selecting a first acceleration profile according to the invention.

FIG. 1 illustrates the process according to the invention for obtaining a first acceleration profile which describes the probable acceleration profile of the vehicle occupants. From data, which is furnished by a pre-crash sensor system (not shown) and data concerning the specific vehicle (in a first approximation), the expected acceleration profile from each occupant during an accident is obtained. This takes place immediately before the beginning of the accident. The sensor operates, for example, on an optical or on a radar basis, (compare, for example, earlier German Patent Application 19620886 corresponding to U.S. Ser. No. 08/859,250, filed May 20, 1997, and commonly owned by the assignee of the present invention, the specification of which is hereby expressly incorporated by reference herein).

Data in the pre-crash sensor system is information concerning the impact object, along with geometrical/physical parameters with respect to vehicles utilizing the present inventive process. The parameters are listed as examples in a field marked 1. In this case, the data concerning the impact speed, site and angle of the impact object are taken into account, as well as the dimensions and weight of the impact object. The weight is obtained as an estimated value of the dimensions of the object.

Data of the subject vehicle is related thereto, of which the most important data, specifically the stiffness characteristics, are mentioned as examples in a field marked 2. From a data bank (not shown), the probable acceleration profile is then selected from a table of acceleration profiles filed there. As an alternative, the probable acceleration profile can also be calculated on board. As the data used as the basis for the selection and calculation becomes more detailed and complete, the thus obtained acceleration profile will more closely correspond to the actual profile.

Figure 2:
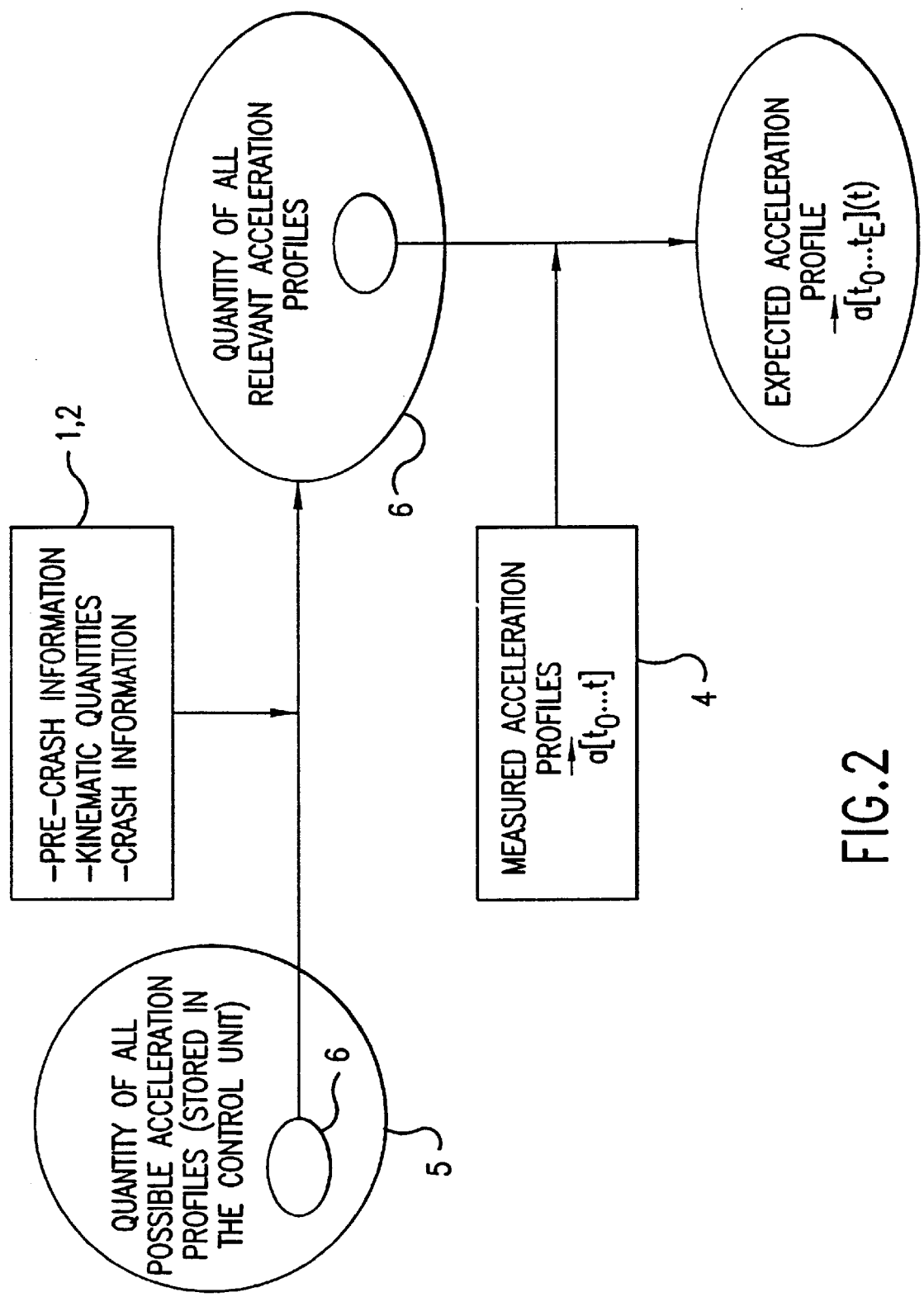
FIG. 2 is a block diagram of the process for the adaptation of the expected acceleration profile which is relevant to controlling the occupant safety devices for the actual profile according to the invention.

FIG. 2 illustrates the process according to the invention for the adaptation of the expected acceleration profile which is relevant to controlling the occupant safety devices for the actual profile. The acceleration obtained beforehand, that is, before the start of an accident, is compared with the acceleration profile 4 measured on board via a suitable sensor system. If the expected acceleration profile deviates from the actual profile, the initially assumed theoretical acceleration profile (FIG. 1) is abandoned in favor of another acceleration profile which better describes the actual acceleration profile.

With the assumption (theoretical) that acceleration profiles which are stored for this purpose are taken into account, the selection can be reduced in its complexity and therefore in its computing time if, prior to the start of the accident (on the basis of the available data), preselection is performed. From the quantity of all stored possible acceleration profiles 5, the quantity of all relevant acceleration profiles 6 is selected. Similarly to the first selection (FIG. 1), the pre-crash data and kinematic values (1 and 2, FIG. 1) as well as additional information which is detected during the accident can be used as the selection criteria. From the quantity 6, a profile is selected which corresponds to reality as optimally as possible and the performed selection is optimized constantly. The expected profile will then permit a precise prediction of the actual acceleration profile.

The method of operation of the process according to the invention is explained via FIG. 3 and a simple example. The actual (=measured) and the above-described expected profile of the vehicle acceleration (a) during an accident and the time from (to) to (tE) is shown for one dimension and at three different points in time and compared.

At the start of the accident ($t_0$), the measured actual acceleration (a) is equal to zero (diagram A). Because of the received sensor signals, an acceleration curve illustrated in A' is expected. The triggering point in time ($t_Z$) for an air bag is as indicated. Until another point in time ($t_1$) (assumed as an example), the acceleration will take place as indicated in B'. On the basis of this profile, the expected acceleration profile is corrected and matched with the actual profile. The subsequent expected profile is shown in B'. The triggering point in time $t_Z$ will now be at a later time.

In reality, the actual subsequent profile is again different than expected. Until a point in time ($t_Z$), the acceleration takes place as indicated in C'. The point in time at which an acceleration value is reached which is relevant in the case of conventional controls is ($t_Z$). This results in a further corrected additional profile, as illustrated in C'. A triggering point in time ($t_Z$) for occupant safety devices is derived therefrom which is again at a later point in time.

With respect to the postponing of the triggering point in time ($t_Z$), the illustrated example has no general validity. It is even possible to trigger the safety device before a defined acceleration value is reached.

Figure 4:
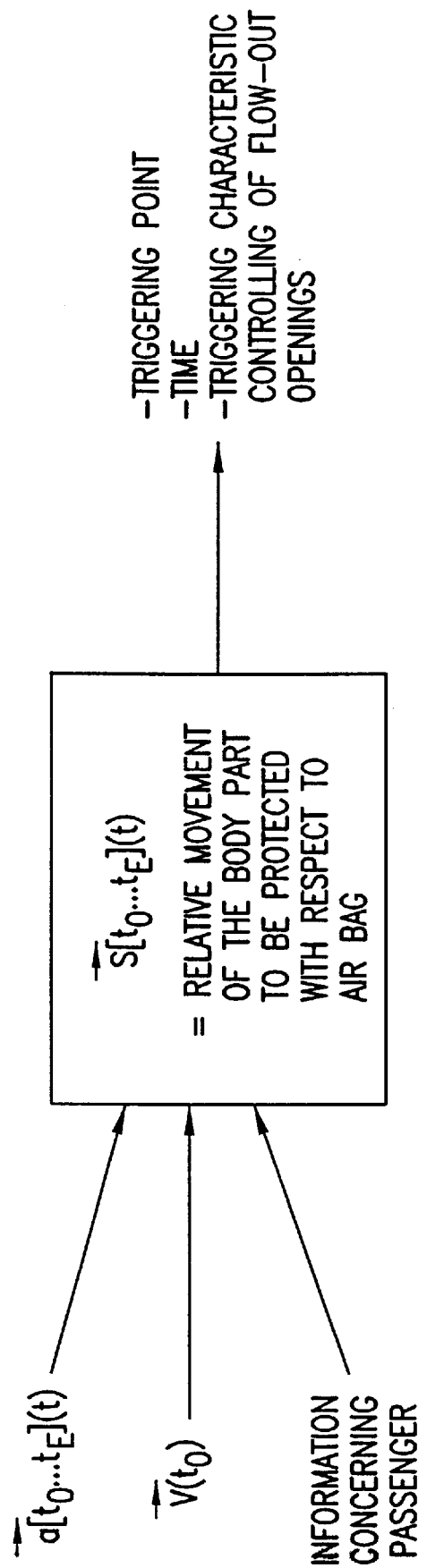
FIG. 4 is a diagram depicting the safety measures resulting from the acceleration profiles.

From the expected (as a rule) multi-dimensional acceleration profile of the vehicle which is optimally adapted to the actual profile, individual strategy controls are obtained during the accident for the individual safety devices. These relate (for example) to the triggering point in time, the triggering characteristics, the time variation, etc. (see FIG. 4). In the case of an air bag, the time variation means (for example) the controlling of the outflow openings.

In addition to the expected acceleration profile, the movement parameter (v) of the vehicle with respect to the speed, the direction, the yaw rate, the weight, the load distribution, etc. is also relevant to this strategy. As a rule, a suitable sensor system exists in the vehicle and is used for controlling systems and components of the vehicle during normal driving. In addition, information is taken into account concerning the respective occupant. This information, such as the size, weight, seating posture, seating position, age and sex is determined on board via a sensor system or taken out of memory in which the aforementioned types of data are filed.

From this data, the relative movement (s) of the parts of the occupants' bodies to be protected is calculated and the strategy for controlling the occupant safety devices is selected such that optimal protection of a vehicle occupant is provided.

Figure 5:
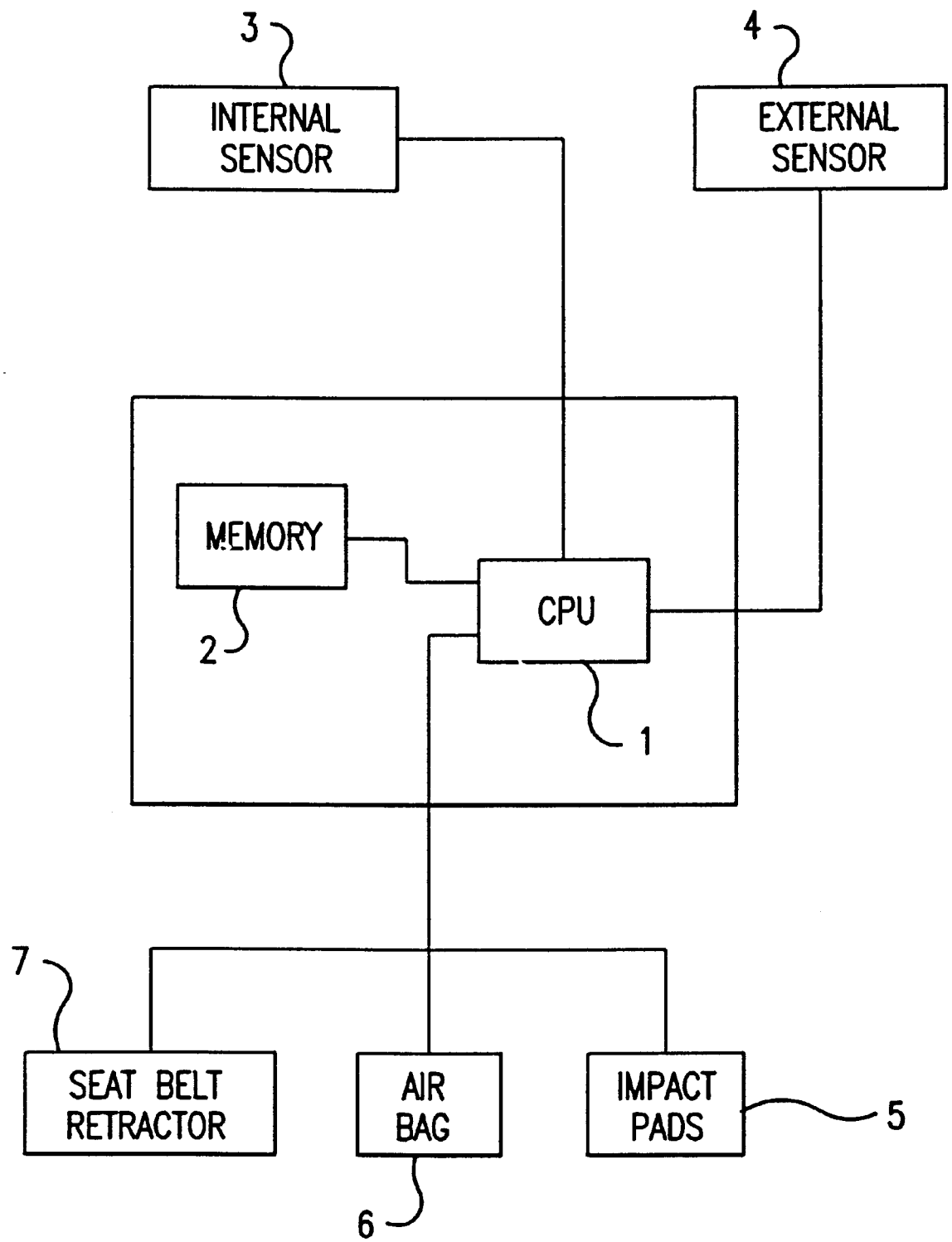
FIG. 5 is a schematic block diagram of a typical system for implementing the process according to the invention.

FIG. 5 is a schematic block diagram of an apparatus for implementing the process according to the invention. An internal sensor 3 and an external sensor 4 are connected to a CPU 1. The CPU 1, inter alia, implements the process according to the invention. A memory 2 that contains, inter alia, stored acceleration profiles is also connected to the CPU 1. Coupled to the CPU 1 is (for example) a seat belt retractor 7, an air bag 6 and impact pads 5. These are activated in correspondence to specific requirements. Naturally, other safety devices can be connected to the CPU 1 for activation according to the specific requirement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling occupant safety devices taking into account an occupant's expected movement relative to a vehicle, comprising
    determining an initial expected acceleration profile for the vehicle during an accident;
    determining an occupant's individual parameters;
    measuring an actual acceleration profile of the vehicle which occurs up to a respective point in time during an accident;
    Generating a modified expected acceleration profile of the vehicle, based on a comparison of the initial expected acceleration profile and measured actual acceleration data;
    determining an expected movement of a vehicle occupant relative to the vehicle based on the modified expected acceleration profile of the vehicle and on the occupant's individual parameters; and
    controlling operating parameters of said safety devices based on the expected movement of the vehicle occupant.

2. The process according to claim 1, wherein the initial and modified expected acceleration profiles of the vehicle are selected from stored acceleration profiles.

3. The process according to claim 2, wherein selection of the initial expected acceleration profile is made based on information detected by a pre-crash sensor system.

4. The process according to claim 2, wherein modification of the initial expected acceleration profile to determine a modified expected acceleration profile is made based on data furnished by an internal acceleration sensor system.

5. The process according to claim 3, wherein modification of the initial expected acceleration profile to determine a modified expected acceleration profile is made based on data furnished by an internal acceleration sensor system.

6. The process according to claim 1, wherein at least one of a selection and a change of the acceleration profile is made based on via data representing an external object.

7. The process according to claim 1, wherein the occupant's individual parameters are determined in real-time.

8. The process according to claim 1, wherein the occupant's individual parameters are retrieved from a memory device.

9. A process for controlling occupant safety devices in a vehicle, comprising:
    determining individual parameters of a vehicle occupant;
    determining an initial expected acceleration profile of the vehicle during an accident;
    measuring in real time an acceleration profile of the vehicle during an accident;
    modifying the initial expected acceleration profile of the vehicle to generate a further expected acceleration profile, based on the measured real-time acceleration profile during an accident;
    calculating expected movement of a vehicle occupant based on the further expected acceleration profile of the vehicle, and the occupant's individual parameters; and
    controlling operation of said occupant safety devices, based on the expected movement of said vehicle occupant.

10. The process according to claim 9, wherein the initial and second expected acceleration profiles of the vehicle are selected from stored acceleration profiles.

11. The process according to claim 10, wherein selection of the initial expected acceleration profile is made based on information detected by a pre-crash sensor system.

12. The process according to claim 10, wherein a change from the initial expected acceleration profile to the second expected acceleration profile is made based on data furnished by an internal acceleration sensor system.

13. The process according to claim 11, wherein a change from a first selected acceleration profile to a second acceleration profile is made based on data furnished by an internal acceleration sensor system.

14. The process according to claim 9, wherein at least one of a selection and a change of the acceleration profile is made based on data concerning an external object.

15. The process according to claim 9, wherein the individual parameters of the vehicle occupant are determined in real-time.

16. The process according to claim 9, wherein the individual parameters of the vehicle occupant are retrieved from a memory device.

17. An apparatus for controlling occupant safety devices in a vehicle; comprising:
    means for determining individual parameters of a vehicle occupant;
    means for determining an initial acceleration profile of the vehicle during an accident;
    means for measuring in real time an acceleration profile of the vehicle during an accident;
    means for modifying the initial expected acceleration profile of the vehicle to generate a further expected acceleration profile, based on the measured real-time acceleration profile during an accident;
    means for calculating an expected movement of a vehicle occupant based on the further expected acceleration profile of the vehicle and the occupant's individual parameters; and
    means for controlling operation of said occupant safety devices, based on the expected movement of said vehicle occupant.

18. The apparatus according to claim 17, wherein the initial and second expected acceleration profiles of the vehicle are selected from stored acceleration profiles.

19. The apparatus according to claim 18, wherein selection of the initial expected acceleration profile is made based on information detected by a pre-crash sensor system.

20. The apparatus according to claim 17, wherein a change from a first selected acceleration profile to a second acceleration profile is made based on data furnished by an internal acceleration sensor system.

21. A method for controlling occupant safety devices of a vehicle, comprising:
    vehicle pre-crash sensors detecting pre-crash data when a collision of the vehicle is imminent;
    selecting an initial expected acceleration profile for the vehicle during the accident based on detected pre-crash data;

measuring an actual acceleration profile of the vehicle in real time during a crash;

modifying the initial expected acceleration profile based on a measured actual acceleration profile of the vehicle during an initial phase of a crash; and adjusting operating parameters of the safety devices based on the modified expected acceleration profile and on actual parameters of a vehicle occupant.

* * * * *